United States Patent [19]

Yatsushiro et al.

[11] 4,334,164
[45] Jun. 8, 1982

[54] MULTI-SPEED PERMANENT MAGNET MOTOR

[75] Inventors: Kenji Yatsushiro, Chicago; George F. Kuchuris, Bloomingdale, both of Ill.

[73] Assignee: The Singer Company, Stamford, Conn.

[21] Appl. No.: 112,128

[22] Filed: Jan. 14, 1980

Related U.S. Application Data

[63] Continuation of Ser. No. 924,951, Jul. 17, 1978, abandoned.

[51] Int. Cl.³ .......................................... H02K 16/00
[52] U.S. Cl. ................................. 310/114; 310/126; 310/163
[58] Field of Search .............................. 310/162–165, 310/172, 112, 114, 126, 156

[56] References Cited

U.S. PATENT DOCUMENTS 1,946,289  2/1934  Lilienthal .......................... 310/163
2,019,683  11/1935  Kohlhagen ..................... 310/172 X
3,535,571  10/1970  Heinzen ......................... 310/164 X Primary Examiner—Donovan F. Duggan
Attorney, Agent, or Firm—Bayard H. Michael

[57] ABSTRACT

Each of the motor stator poles has a window cut out which functions to create an unbalanced flux distribution and move the magnetic neutral off the centerline of the stator pole. A plurality of permanent magnet rotors are mounted on a common shaft to permit a desired rotor to be moved into the stator field. Each rotor has a different number of poles selected so with any rotor there will always be a whole odd number of poles within the span of a stator pole. Speed is determined by the number of poles in the rotor in operative position.

3 Claims, 3 Drawing Figures

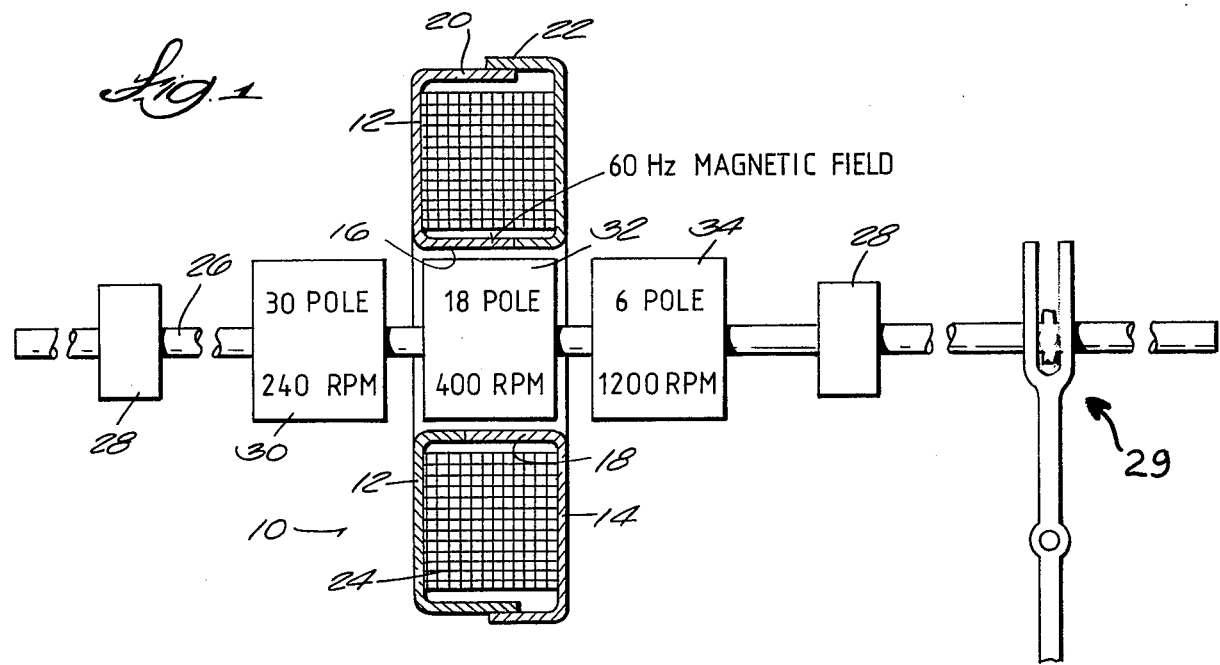
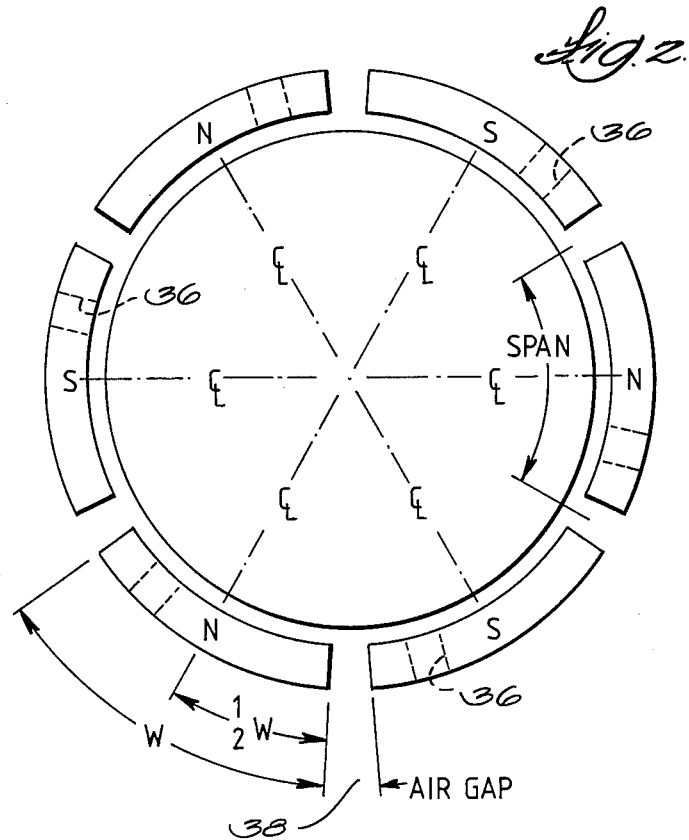
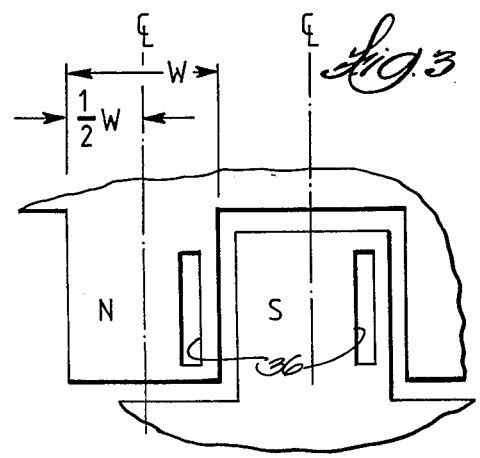

MULTI-SPEED PERMANENT MAGNET MOTOR

This application is a continuation of Ser. No. 924,951, July 17, 1978, abandoned.

FIELD OF THE INVENTION

Changing output speed has typically involved changing gear ratios or use of additional motors. Since the power transmitted by gearing remains essentially uniform as ratios change there is an inescapable loss in torque as output speed increases. Use of additional motors involves significant increase in cost.

SUMMARY OF THE INVENTION

The purpose of this invention is to provide a permanent magnet synchronous motor having multiple output speeds. It is a further purpose to provide multiple speeds using a single field coil and stator set. And the foregoing is to be accomplished without changing gear ratios and without reduction in output torque at higher speeds.

The objects have been accomplished through use of a stator pole design which is inherently unbalanced and which with any of the rotors will result in unbalanced flux distribution assuring starting and direction control. The use of multiple rotors is believed to be new. Each rotor is magnetized to give a different number of poles making different speeds possible by simply moving the stator or rotor to place a different rotor into the coil field. The rotor speed can be changed while the motor is running.

BRIEF DESCRIPTION OF THE DRAWINGS

FIG. 1 is a schematic drawing illustrating the general arrangement of this invention.

FIG. 2 illustrates a stator pole arrangement.

FIG. 3 is a partial view of the stator poles laid out flat to show the cut out portions to create an unbalanced magnetic field.

DESCRIPTION OF THE PREFERRED EMBODIMENT

The coil casing 10 is made up of two cup-like case halves 12, 14 each of which has three stator poles lanced and formed to intermesh with the poles of the other case half. Thus case half 12 has three poles 16 and the other half has three poles 18. The outer axial flanges 20, 22 nest and may be welded. Coil 24 is mounted in the casing. With alternating current applied to the coil the stator poles 16, 18 will alternately be magnetized North and South, as depicted in FIG. 2 with the understanding that the North poles will be South poles on the next half cycle. The motor is provided with a long shaft 26 rotatably journaled in bearings 28, 28 and axially moveable in the bearings by means of shifting fork 29 to position any of the three rotors 30, 32, 34 in the magnetic field of coil 224.

Each rotor is a permanent magnet rotor fixed on the shaft and alternately magnetized with North and South poles at the periphery. As shown the rotors 30, 32, 34 are provided with 30, 18 and 6 poles, respectively, and will provide, when positioned in the field of coil 24, speeds of 240, 400 and 1200 RPM (with 60 Hz voltage supply). As shown in FIG. 1 the 18 pole rotor 32 is in the field of coil 24 and will provide a shaft speed of 400 RPM. Any suitable means may be employed to shift the rotor shaft to change speeds. The motor can be running or stationary during shifting. It will be appreciated the rotor shaft can be fixed axially and the stator can be shifted relative to the rotors. This would permit the bearings to be placed closer together and could simplify the output drive.

To insure starting and direction control it is necessary to have an unbalanced magnetic flux distribution. Typical solutions used in conjunction with motors having an equal number of stator poles and rotor poles equally spaced and of equal metal volume are asymmetric stator or rotor poles, auxiliary stator poles, and shaded poles. Those methods will not work in this design since rotors having different numbers of poles must operate in the same coil field. Our solution is shown in FIGS. 2 and 3. In FIG. 3 two poles are shown laid flat. Each pole has a width W and in one half of the pole an aperture or window 36 is provided so the magnetic flux distribution is unbalanced and the magnet neutral is moved to the left (FIG. 3) of the stator pole centerline. This unbalance will assure self-starting and direction control if within the span of a stator pole (FIG. 2) there is always a whole odd number of rotor poles. In the present example, the 30 pole rotor has 5 rotor poles encompassed by one stator pole, the 18 pole rotor has 3 rotor poles encompassed by one stator pole and the 6 pole rotor has 1 pole encompassed by a stator pole. The span of a stator pole should be clearly understood. It is the width W of the pole plus twice one-half of the air gap 38. Expressed in degrees it is 360 divided by the number of stator poles ... in this case, 360/6=60°. Within that 60° there must be 5, 3, or 1 rotor poles (or 7, 9, etc.). Having selected 6 stator poles (for ease of construction) it then becomes apparent the number of rotor poles will be 6 multiplied by 1, 3, 5, etc. giving possible rotor pole numbers of 6, 18, 30, 42, 48, 54, etc. The selection of the number of stator poles is the basis for arriving at the number of rotor poles.

This method of obtaining different motor speeds is less costly than using multiple motors and there is no gear changing. With gear changing there is a loss of torque with higher output speeds. In this design there is an increase in torque with increasing speed and this means power is increased with increased speed (instead of remaining constant as with gear changing).

We claim:

1. An electric motor comprising,
   a stator assembly including a coil and at least six stator poles each of which has an angular embrace equal to 360° divided by the number of stator poles,
   the flux of all said stator poles being in phase and the magnetic field of each of said stator poles being unbalanced in the same direction by removal of material from the same half of each stator pole,
   a rotor assembly coaxial with the stator assembly and having a rotor shaft and a plurality of rotors mounted on the shaft,
   one assembly being movable with respect to the other assembly to selectively position one of the rotors in the field of said coil,
   said rotors being permanently magnetized to provide rotor poles, each rotor having a different number of poles and the number of poles in each rotor being a whole odd number multiple of the number of stator poles so there is always an odd number of rotor poles within the embrace of each stator pole to ensure starting while the rotational speed of the rotor assembly is determined by the number of rotor poles in the rotor positioned in the field of the coil.

2. An electric motor according to claim 1 including means for moving the rotor assembly axially of the stator assembly to position a selected rotor in the field of said coil.

3. An electric motor according to claim 2 in which there are six stator poles and three rotors having 6, 18 and 30 rotor poles, respectively.

* * * * *